United States Patent [19]

Caldana

[11] Patent Number: 5,560,270
[45] Date of Patent: Oct. 1, 1996

[54] METHOD FOR THE CONTROLLED REMOVAL OF CHIPS IN BORING MILLS

[75] Inventor: Franco Caldana, Lidkoeping, Sweden

[73] Assignee: Minganti International Limited, Ireland

[21] Appl. No.: 238,739

[22] Filed: May 5, 1994

[30] Foreign Application Priority Data

May 10, 1993 [SE] Sweden .................... BA93A0207

[51] Int. Cl.[6] ........................... B23B 35/00; B23B 47/34
[52] U.S. Cl. ..................... 82/1.11; 408/59; 82/901
[58] Field of Search .................. 82/1.11, 50, 900, 82/901; 408/57, 59, 61; 409/136, 137

[56] References Cited

U.S. PATENT DOCUMENTS

| | | |
|---|---|---|
| 2,033,946 | 3/1936 | Lippincott . |
| 4,322,992 | 4/1982 | Remillard et al. ................ 82/901 |
| 4,475,853 | 10/1984 | Morgan ........................... 408/56 |
| 4,951,578 | 8/1990 | von Haas et al. ................ 409/136 |
| 5,022,793 | 6/1991 | Hoshino et al. . |

FOREIGN PATENT DOCUMENTS 2130931  6/1984  United Kingdom ............ 408/59

OTHER PUBLICATIONS

Patent Abstracts of Japan vol. 11. No. 34 (M-558) 31 Jan. 1987 & JP-A-61 203 246 (Jiyouban Seisakusho) * with English abstract *.

Patent Abstracts of Japan vol. 10, No. 151 (M-483) 31 May 1986 & JP-A-61 004 646 (Hisao Kishida) * with English abstract *.

Patent Abstracts of Japan vol. 9, No. 229 (M-413) 14 Sep. 1985 & JP-A-60 085 803 (Mitsubishi Jukogyo) * with English abstract *.

*Primary Examiner*—M. Rachuba
*Assistant Examiner*—Kenneth J. Hansen
*Attorney, Agent, or Firm*—Larson and Taylor

[57] ABSTRACT

The chuck, the bar which operates it, and the cylinder and piston assembly which moves the bar are axially hollow and form a vertical duct which is open at the top next to the workpiece and which is open at the bottom over a conveyor with a filter and a unit for collecting and pumping the cutting fluid. The chips from the piece are channelled and removed downwards through the said duct by at least one jet of fluid at high pressure, which has a location and direction such that it strikes the chip after its formation without interfering with the normal jet of fluid at low pressure which is applied to the tool. The said jet or jets of fluid at high pressure consist of the same cutting fluid as that which is directed against the tool at low pressure. The chips leaving the lower end of the said duct fall on to the conveyor which removes them and separates them from the cutting fluid which, when suitably filtered, is returned to circulation by low-pressure and high-pressure pumps.

6 Claims, 4 Drawing Sheets

METHOD FOR THE CONTROLLED REMOVAL OF CHIPS IN BORING MILLS

BACKGROUND AND SUMMARY OF THE INVENTION

The present invention is intended to resolve the problem of the removal of chips in boring mills, in order to prevent the chips from remaining in the working region of the tool and causing problems concerning the quality of machining of the piece, the life of the tool and the automation of the working cycle of the boring mill.

The invention is intended to resolve this problem with the following idea for a solution. The chuck of the boring mill and the corresponding operating bar, together with the moving unit of the cylinder and piston assembly which provides the axial movement of the bar, are made with an axially hollow shape, so that they form a vertical duct which is open at the top next to the workpiece mounted in the chuck, and is open at the bottom above a conveyor with a filter and a unit for collecting and pumping the cutting fluid. The chips which are formed during the machining of the piece mounted in the chuck are transported and removed downwards, through the said duct, by at least one jet of fluid at high pressure, for example of the order of at least 130–200 bar, which has a location and direction such that it strikes the chip after its formation without interfering with the normal jet of fluid at low pressure which is applied uniformly to the tool. The jet or jets of fluid at high pressure which remove the chips consist of the same cutting fluid as that which is directed against the tool at low pressure. The chips and cutting fluid leaving the lower end of the said vertical duct are collected by the conveyor and filter assembly which removes the chips to a collection area and which filters and collects the fluid which is supplied by two different sets of pumps to the ducts formed in the toolholder and from which the jets at high and low pressure emerge for the various purposes mentioned above.

BRIEF DESCRIPTION OF THE DRAWINGS

Further characteristics of the invention and the advantages derived therefrom will be clearly understood from the following description of a preferred embodiment of the invention, illustrated purely by way of example and without restriction in the figures on the four attached sheets of drawings, in which.

DESCRIPTION OF THE PREFERRED EMBODIMENT OF THE INVENTION

Figure 1:
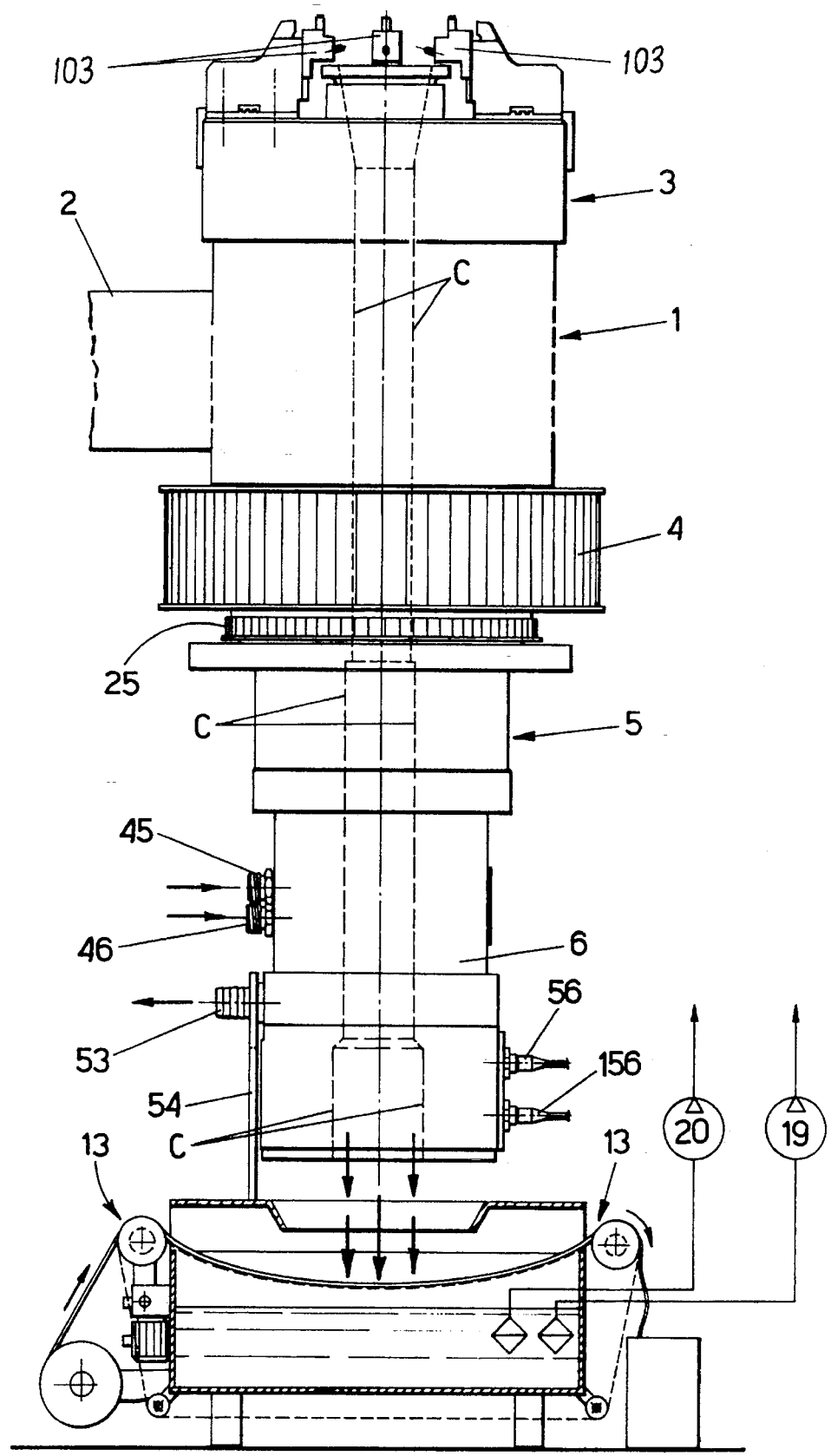
FIG. 1 is a schematic side elevation of the arbor of a boring mill improved according to the invention.

In FIG. 1, the reference 1 indicates the arbor of the boring mill, which is fixed by the stator part 101 to a base structure 2. The chuck 3 is mounted on top of the rotating part of the arbor and grips the workpiece with its jaws 103. With the part which projects downwards from the stator 101, the said rotating part of the arbor carries the toothed pulley 4 connected with a belt to a driving motor which is not shown, and also carries and is keyed to the body of a cylinder and piston assembly 5 operating by fluid pressure, with an associated rotating distributor 6, for the supply of the assembly 5 from fixed points, which in turn is fixed to a fixed point 54 of the base 2 or of other fixed parts.

According to the invention, the piston of the cylinder and piston assembly 5 is axially hollow and is fixed at the lower end of the vertical bar 7 (FIG. 2) which is also axially hollow (see below) and is fixed by its upper end to the mechanism 203 for opening and closing the jaws 103 of the chuck 3. The upper end of the bar 7 projects beyond the previously mentioned mechanism 203 and has inserted in it telescopically, with sufficient clearance, a funnel 8 fixed with clamps 9 in the radial cavities of the body of the chuck 3. The upper shape of the funnel may vary according to the shape of the workpiece, and the funnel may advantageously be associated with reference pieces 10 on which the workpiece P is initially positioned so that it is correctly placed before being gripped by the jaws 103. The funnel 8 has the function of extending, and bringing as close as possible to the workpiece, the vertical duct C which passes through the bar 7 and the corresponding operating cylinder 5, and which is designed for the collection and removal of the chips.

According to the example in FIG. 2, the bar 7 is formed by a hollow rod 107 fixed by its lower end to the piston of the cylinder and piston assembly 5 (see below) and fixed by its upper end to a tube 207 on which an extension tube 307 is screwed, the flange 11 integral with the chuck opening and closing mechanism 203 being clamped between the two tubes. The tube 307 has externally fitted seals 12 with which it slides with a lateral seal through the part 303 of the body of the chuck. It is to be understood that the bar 7 may be made with a number of parts different from that described, for example with two parts or with only one part.

The device of a known type 13, which collects the chips and the cutting fluid from the machining of the piece, which removes the chips to a collection point, and which filters the fluid which is then taken up by suitable pumps (see below) and supplied to the tool-holder, is disposed below the previously mentioned vertical duct C.

Figure 2:
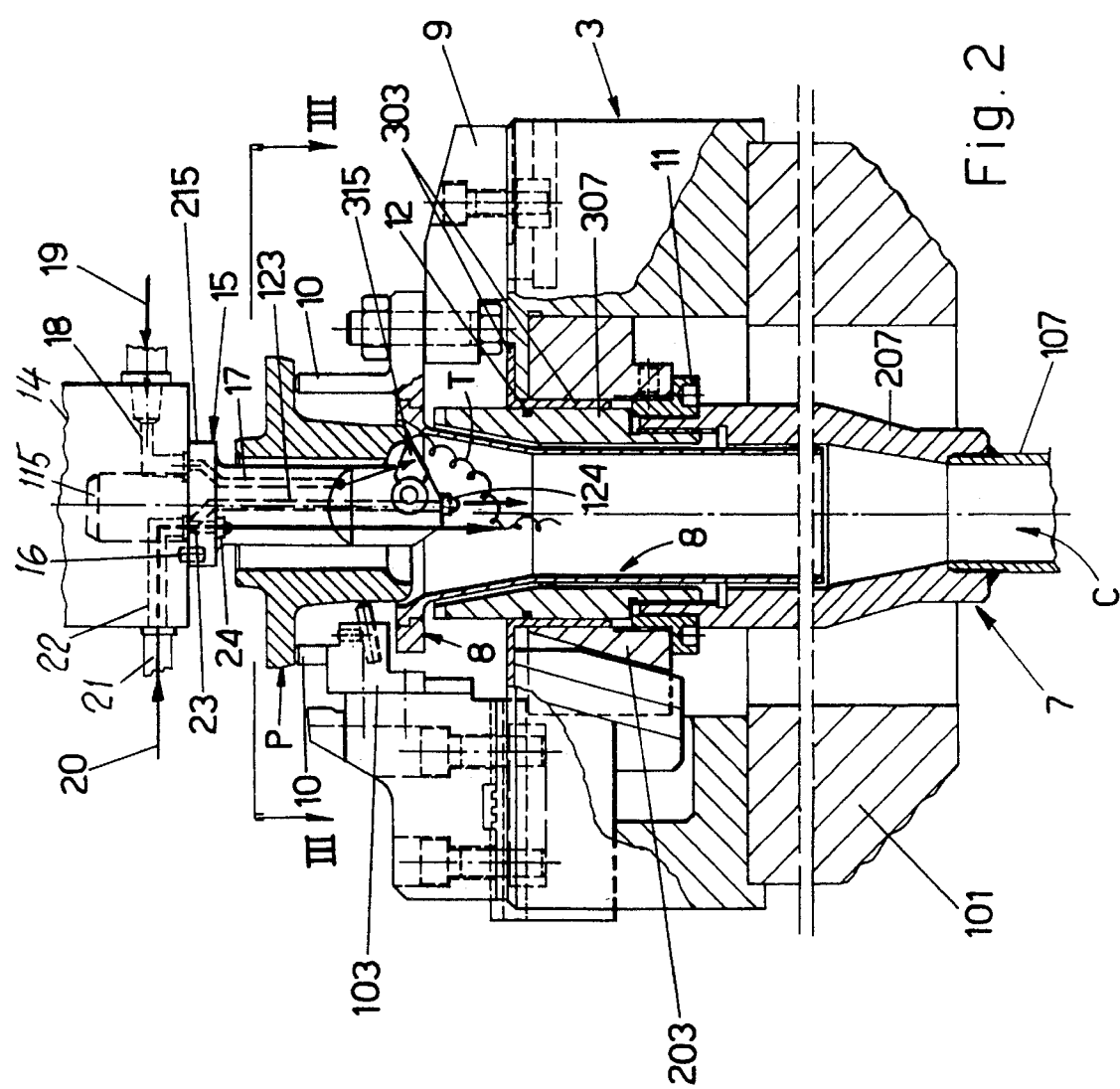
FIG. 2 is a longitudinal section with details of the upper part of the arbor of the boring mill, with the chuck, with a section of the corresponding operating bar, with the workpiece mounted and with the toolholder in the operating state and also improved according to the invention.

In FIG. 2, 14 indicates the support which is fixed to the orthogonal movement slide of the boring mill and which is designed to hold securely, with a rapid and known method of attachment, the mounting or shank 115 of the toolholder 15, provided with a flange 215 which bears frontally on the underside of the said body. The flange 215 is normally provided with an offset cavity open at the top for interaction with a reference pin 16 carried by the support 14, to ensure the centring and consequent connection between the upper end of a duct 17 formed in the toolholder 15 and the lower end of a duct 18 which is formed in the support 14 and abuts against a duct leading from a low-pressure pump 19 which draws the cutting fluid from the reservoir of the device 13 (FIG. 1). The lower end of the duct 17 opens in the intermediate part of the body of the toolholder 15, of an inclined plane, and supplies the cutting fluid to the tool 315, with known characteristics of pressure and flow. By way of indication, the pressure of the fluid leaving the duct 17 is approximately of the order of 30 bar.

According to the invention, the cutting fluid is also drawn from the reservoir of the device 13 by a pump 20 capable of operating at a very high pressure, for example of the order of at least 130–200 bar, with a flow rate of the order of approximately 30 litres per minute, and the fluid at high pressure is sent through a duct 21 into a duct 22 formed in the support 14. The duct 22 opens on to the lower face of the support 14 and abuts on and is connected to a duct 23 which passes through the flange 215 and which emerges from the latter with a location and direction such that a jet of fluid at high pressure is supplied and passes from the top to the bottom of the workpiece P, runs in the clearance between the duct C and the toolholder 15, and does not interfere with the jet of fluid at low pressure which is directed against the tool and strikes the chip after its formation, impelling it towards the collection and removal device 13.

An adjustable nozzle 24 may be mounted at the lower end of the duct 23.

Figure 4:
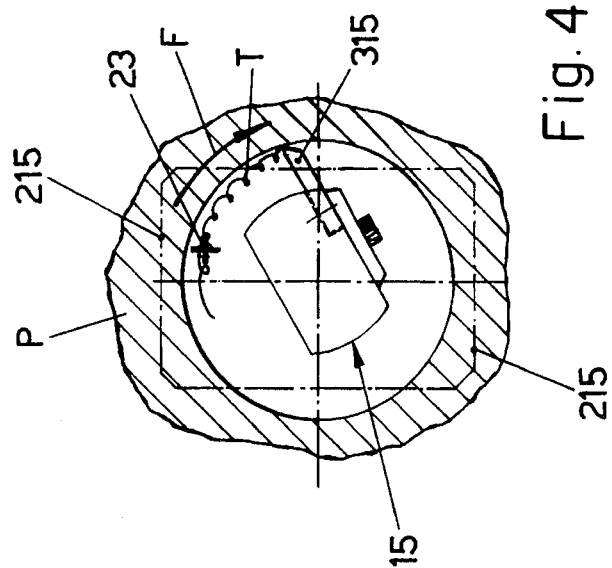
FIG. 4 shows further details of the toolholder as in FIG. 2, seen in the state of machining of the piece and in section along the line III—III.

FIG. 4 shows that the jet of fluid at high pressure which emerges from the duct 23 may be located at the point, easily deducible from practical tests, at which, according to the direction of rotation F of the piece P and to the shape of the tool 315 and/or any other parameters, the chips T tend to accumulate, so that these chips are rapidly struck by the said jet of fluid and compelled to flow downwards. The location of the jet of fluid at high pressure above the tool permits action on those chips which initially tend to rise rather than to fall.

It is to be understood that the location of the jet of fluid at high pressure may be different from that shown, and that a number of jets at high pressure, suitably spaced apart and distributed in the round angle, may be provided, the whole in a way which may be understood and easily applied by engineers working in this field.

The jet of fluid at high pressure may be directed downwards, parallel to the axis of the arbor or suitably inclined, so that a true vortex is formed in the duct C.

As an alternative to the above, the duct 21 may be made to communicate with ducts 123 formed in the flange 215 and in the body of the toolholder 15 and discharging into the lower end of this body, below the tool 315, so that at least one jet of fluid at high pressure, useful for the removal of the chips, is discharged from the lower part of this body, possibly through an adjustable nozzle 124.

According to a preferred embodiment of the invention, a combined supply of jets of fluid at high pressure is provided from both duct 23 and duct 123, and consequently from both the upper and the lower part of the toolholder.

The advantages derived from the solution described may be summarised as follows. Because of their weight, the chips have a natural tendency to fall. The jet or jets of fluid at high pressure promote the natural removal of the chips, so that no accumulations of chips occurs in the working area of the tool as occurs in the known art, with advantages both in the quality of machining and in the life of the tool. It has been found from long-term tests that the like of the tool is almost doubled by comparison to that of the tools used in boring mills of known type.

Since all the chips are directed and removed downwards, the chuck of the boring mill remains clean and in the best condition to be served by automatic systems for the supply and removal of the workpieces and the finished pieces.

Figure 3:
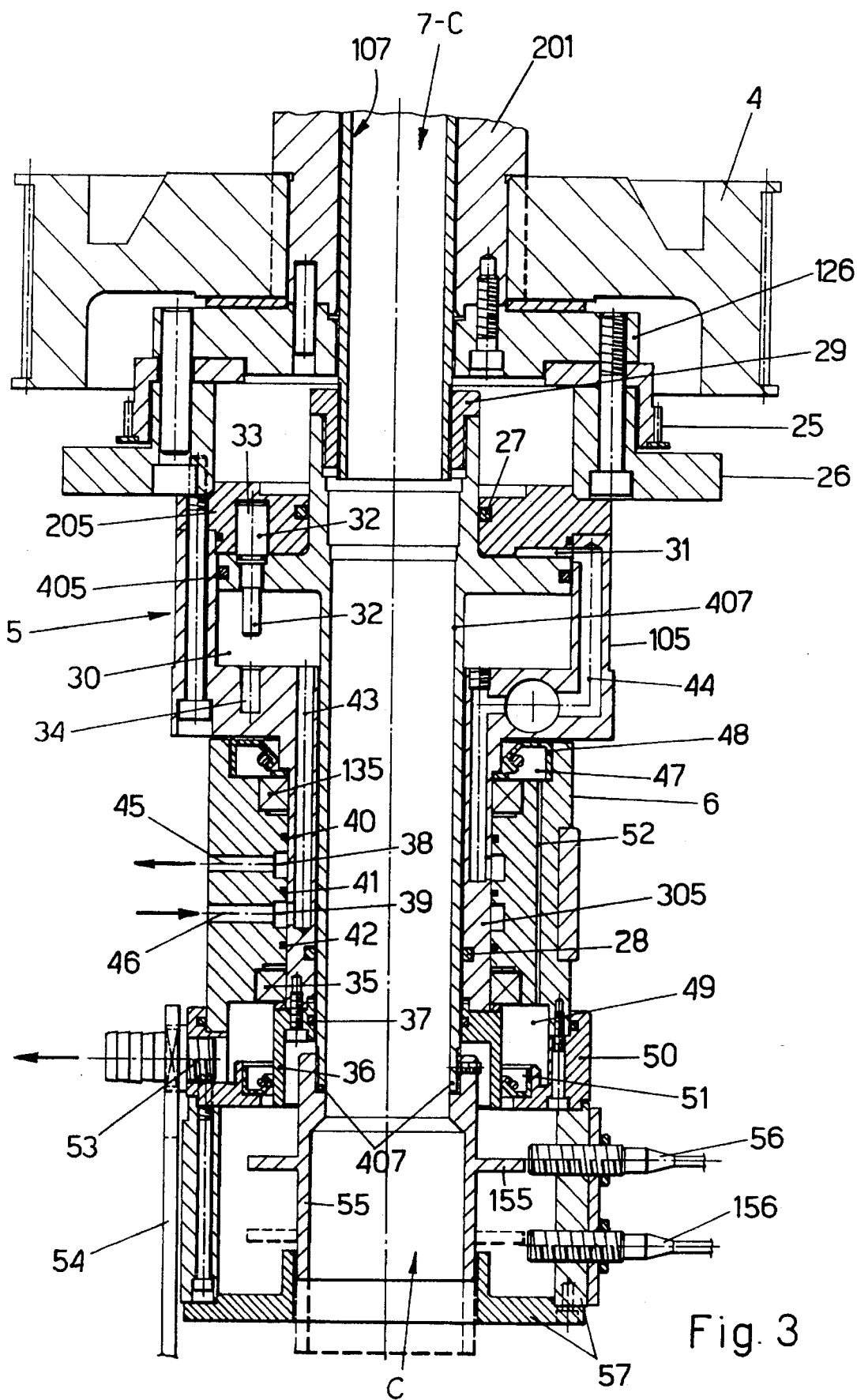
FIG. 3 is a longitudinal section with details of the intermediate and lower part of the arbor of the boring mill, with the drive pulley, with the tachometer pulley, and with the axially hollow cylinder and piston assembly which moves the operating bar of the chuck.

With reference to FIG. 3, it will be seen that the drive pulley 4 and the pulley 25 connected to the tachometer unit of a known type, designed for the monitoring of the rotation speed and angular position of the arbor, are keyed to the lower part of the rotating part 201 of the arbor. The pulley 25 is fixed between a pair of flanges 26–126, the latter of which is fixed to the rotating part 201, and the part 107 of the hollow bar 7 projects axially from this assembly. The body 105 of the cylinder and piston assembly 5, provided at its top with the cover 205 and extended below by a part 305 of restricted external section, is fixed coaxially to the flange 26. The axially hollow stem 407 of the assembly 5 passes axially and with a lateral seal through the parts 205 and 305, see the seals 27–28, and projects by an exact amount from these parts and is fixed by its upper end, which is suitably designed, to the part 107 of the bar 7, for example by screwing and with the interposition of a bush 29. The stem 407 of the assembly 5 carries and is integral with the piston 405 which slides with a lateral seal in the body 105 and delimits two opposing pressure chambers 30 and 31 in this body. To prevent rotation of the piston 405 and of the stem 407 with respect to the body 105, a pin 32, parallel to the axis of the assembly 5, is mounted in an eccentric position on this piston, and projects from both faces of the piston, and can interact with opposite guide recesses 33 and 34 formed on the cover 205 and on the bottom of the body 105. Before the upper part of the pin 32 leaves the socket 33, the lower part of this pin begins to interact with the guide 34, and vice versa.

On the lower tapered section 305 of the body of the assembly 5, the annular stator 6 of the rotary coupling is mounted rotatably with the interposition of the bearings 35–135, and is secured axially by the flange 36 fixed frontally on the said part 305 and is provided on its internal diameter with a seal 37 which interacts to form a seal with the external lateral surface of the stem 407.

On the internal lateral surface of the stator 6 there are two annular recesses 38 and 39 which are separated from each other and from the outside by annular seals 40-41-42 and in which are abutted ducts 43 and 44 which are formed in the parts 305–105 of the body of the assembly 5 and whose other open into the chambers 30 and 31 respectively. In the stator 6 there are at least two orifices 45 and 46 abutting on the annular recesses 38–39 and connected to the hydraulic circuit which brings them into the delivery and discharge state alternately for the raising and lowering of the bar.

The stator 6 has at its top an annular chamber 47 with a seal 48 on the part 305 of the body 5. The said stator 6 has at its bottom a similar annular chamber 49 tightly closed by a cover 50 with a seal 51 on the flange 36. The oil with unavoidably penetrates through the seals 40–42 enters the chambers 47 and 49 which are interconnected by holes 52 so that all the oil is collected in the lower chamber. Suitable radial apertures, not shown, may also be provided on the front surfaces of the flange 36 bearing on the part 305 of the body of the assembly 5, so that any leakages of oil which pass through the seal 28 are also forced to accumulate in the chamber 49. Through a duct 53 formed in the cover 50, the chamber 49 is subjected to the suction of a drainage pump, not shown, which discharges into the reservoir of the hydraulic power unit connected to the previously mentioned ducts 45 and 46.

Suitable means are provided to secure the stator 6 to at least one fixed point of the boring mill or of other fixed parts associated therewith. These means may, for example, consist of a fork 54 which interacts with the union of the duct 53 and which is fixed to the frame of the filter device 13.

In FIG. 3, 55 indicates an extension bush fixed coaxially on the lower end of the stem 407 and provided laterally with an annular collar 155 which, depending on the raised or lowered position of the said stem, interacts alternately with one of the sensors 56–156 fixed laterally on a pierced cover 57 through which the said bush passes and which is in turn fixed to the stator 6 of the rotary coupling.

Figure 5:
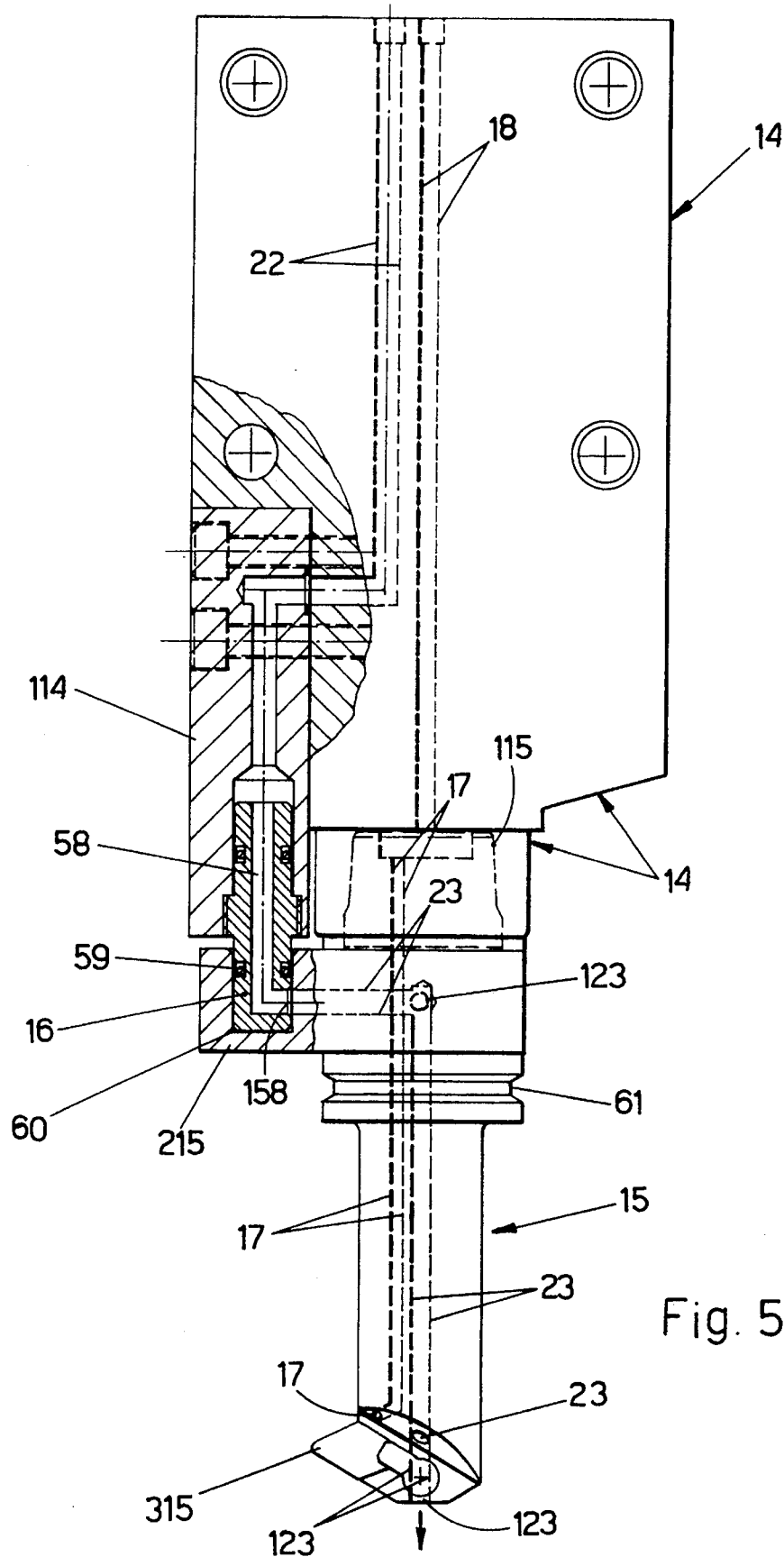
FIG. 5 is a side view, with parts in section, of a toolholder designed for automatic changing and improved according to the invention.

With reference to FIG. 5, it will be seen that the duct 22 for the supply of fluid at high pressure, formed in the body 14 of the support for the toolholder 15, abuts on the pin 16 or on a supplementary pin fixed on the said support 14 or on an inserted part 114. The pin 16 is provided with an axial blind hole 58, which opens laterally on the visible section of the said pin with a hole 158, above which the said pin is provided with an annular seal 59. The hole 23 opens laterally in the hole 60 of the base piece 215 in which the pin 16 is inserted, and, by contrast with the solution shown in FIG. 2, opens on the inclined plane of the toolholder on which the tool 315 is disposed, in such a way that there is no interference with the fluid at low pressure which emerges from the hole 17 and is applied to the said tool.

The hole 123 which discharges from the lower end of the toolholder is branched from the hole 23.

When the toolholder is designed for automatic changing, the collar 61 designed to interact with the change manipulating gripper, which is not shown, is disposed under the base piece 215 and not above as in the known art. With this solution, the said manipulating gripper is prevented from interfering with the pin 16, especially in the case in which more than one toolholder structure of the type illustrated in FIG. 5 is disposed beside each other on the same support slide.

It is to be understood that the description refers to certain preferred and non-unique embodiments of the invention, to which numerous variations and modifications may be made, especially as regards construction, without departing from the guiding principle of the invention, as described above, as illustrated and as claimed below. In the following claims, the references in parantheses have the sole purpose of facilitating the reading of the said claims, and therefore should not be interpreted as in any way restrictive to the scope of protection of the said claims.

I claim:

1. Method for the controlled removal of workpiece chips from a cutting zone of a boring mill comprising:

forming the workpiece chips by cutting a workpiece with a tool from the boring mill;

directing at the cutting zone a first jet of a cutting fluid coming so as to lubricate and cool the tool;

downwardly directing at the cutting zone a second jet of the cutting fluid at an angle with respect to the vertical so as to create a vortex which improves downward transportation of the workpiece chips, wherein said second jet of the cutting fluid is propelled at a pressure at least two times higher than that of the first jet so as to act directly on the workpiece chips formed during boring and wherein said second jet is directed so as not to interfere with the first jet;

drawing said vortex into a funnel located at an end of a vertical duct leading to a cutting fluid collector;

sweeping away the workpiece chips along said vertical duct;

filtering said chips from said cutting fluid accumulated at the fluid collector; and recycling the filtered cutting fluid.

2. The method as claimed in claim 1 wherein the pressure of the fluid coming from the second jet directed against the workpiece chips for downward removal is approximately 130–200 bar.

3. The method as claimed in claim 1 wherein the fluid coming from the second jet is directed from a position at a height above that at which boring occurs.

4. The method as claimed in claim 1 wherein the fluid of the second jet is directed from a position at a height substantially equal to that at which boring occurs.

5. The method as claimed in claim 1 wherein the fluid coming from the second jet is directed from a position at a height lower than that at which boring occurs.

6. The method as claimed in claim 1 wherein the fluid from the second jet is downwardly directed from a position which is substantially vertical to a position in which boring occurs.

* * * * *